United States Patent [19]

Konishi et al.

[11] Patent Number: 4,979,640
[45] Date of Patent: Dec. 25, 1990

[54] APPARATUS FOR ALIGNING/SUPPLYING ELECTRONIC COMPONENT CHIPS

[75] Inventors: Toru Konishi; Kenichi Fukuda, both of Kyoto, Japan

[73] Assignee: Murata Mfg. Co., Ltd., Japan

[21] Appl. No.: 458,897

[22] Filed: Dec. 29, 1989

[30] Foreign Application Priority Data

Dec. 29, 1988 [JP] Japan ................ 63-335107
Dec. 29, 1988 [JP] Japan ................ 63-335108

[51] Int. Cl.$^5$ ............................... B23Q 7/12
[52] U.S. Cl. ........................... 221/156; 221/172
[58] Field of Search ............... 221/156, 157, 171, 172, 221/312 R, 312 B, 312 C; 222/547, 564; 193/46, 44, 25 FT; 198/389

[56] References Cited

U.S. PATENT DOCUMENTS

4,846,345  7/1989  Hamuro et al. .............. 271/174 X
4,889,229  12/1989  Yamamoto et al. ............ 206/328

FOREIGN PATENT DOCUMENTS

0045241  7/1981  European Pat. Off. .
1512938  2/1977  United Kingdom .
2196939  10/1987  United Kingdom .

Primary Examiner—David H. Bollinger
Attorney, Agent, or Firm—Ostrolenk, Faber, Gerb & Soffen

[57] ABSTRACT

An apparatus for aligning/supplying electronic component chips comprises an aligning passage for guiding and moving a plurality of electronic component chips in a state aligned with each other along a prescribed direction, and a chamber which communicates with the aligning passage for storing a plurality of electronic component chips. The chamber at least comprises a small chamber which is formed in the vicinity of an inlet of the aligning passage and a large chamber which communicates with the small chamber. A gradient plane or a rounded face is formed in at least a part of the wall surfaces defining the small chamber when viewed in cross-section according to a plane which is parallel to a direction across the aligning passage, thereby preventing inadvertent retention of electronic component chips between the wall surface within the small chamber and facilitating their movement from the small chamber to the aligning passage.

5 Claims, 4 Drawing Sheets

APPARATUS FOR ALIGNING/SUPPLYING ELECTRONIC COMPONENT CHIPS

BACKGROUND OF THE INVENTION

1. Field of the Invention

The present invention relates to an apparatus for aligning/supplying electronic component chips, which is adapted to align a plurality of electronic component chips, including electrical parts such as passive and active parts, finished chip components and partially fabricated components, along a prescribed direction for supplying the same. More particularly, it relates to an improvement for smoothing movement of a plurality of electronic component chips within such an apparatus for aligning/supplying electronic component chips.

2. Description of the Background Art

The applicant (assignee) has already proposed a cassette storing electronic components, which is advantageously employed for supplying electronic component chips one by one to a chip mounting station, for example, in Japanese patent application Ser. No. 257926/1986 (corresponding to DE3736692A1, GB2196939A and USP4846345), Japanese patent application Ser. No. 96925/1987 (corresponding to EP0288277A2 and USSN184112, now U.S. Pat. No. 4,889,229), or the like.

This cassette storing electronic component chips basically comprises a plurality of electronic component chips, a case having an internal storage space for storing the electronic component chips and an outlet communicating with the internal storage space for discharging the electronic component chips, and an openable closure for closing the outlet. An electronic component chip manufacturer can directly use such a cassette storing electronic component chips as a packaging mode which is applicable to transportation of electronic component chips, while a user of electronic component chips can directly mount the cassette on a chip mounting apparatus for supplying a plurality of electronic component chips one by one to a chip mounting station.

FIG. 7 is a sectional view illustrating a chip mounting step carried out through such a cassette 1 storing electronic component chips, which is shown in phantom lines. The cassette 1 is directly mounted on a hopper 2 of a chip mounting apparatus. In more concrete terms, the cassette 1 is fixed to the hopper 2 so that its outlet faces an opening 3 of the hopper 2, and a closure of the cassette 1 is opened to supply a plurality of electronic component chips 4, which have been stored in an internal storage space of the cassette 1, into the hopper 2 from the outlet.

The hopper 2 is generally inclined at an angle 5 of inclination of about 45°, for example. This hopper 2 comprises a chamber 6 for storing the plurality of electronic component chips 4, and the chamber 6 has a large chamber 7 and a small chamber 8. The electronic component chips 4 supplied into the hopper 2 first flow into the large chamber 7 and then enter the small chamber 8, to finally reach an aligning passage 9. This aligning passage 9 is adapted to guide and move the plurality of electronic component chips 4 in a state aligned with each other along a prescribed direction. In order to achieve this function, sectional dimensions of the aligning passage 9 are selected in relation to the sectional dimensions of each electronic component chip 4.

The small chamber 8 is formed in the vicinity of an inlet 10 of the aligning passage 9, while the large chamber 7 communicates with the small chamber 8.

FIG. 8 is an enlarged perspective view showing the structure provided between the small chamber 8 and a portion close to the inlet 10 of the aligning passage 9. As understood from FIGS. 7 and 8, the small chamber 8 has a bottom wall surface 11 which is flush with a bottom wall surface 12 defining the inlet 10 of the aligning passage 9. In the hopper 2 shown in FIG. 7, the bottom wall surface 11 extends toward the large chamber 7 to form the bottom surface of a groove.

A blowing passage 13 is provided in a portion close to the inlet 10 of the aligning passage 9, in order to introduce compressed air from the exterior in an intermittent manner, for example. The compressed air introduced through the blowing passage 13 blows off and stirs the electronic component chips 4 approaching the inlet 10 of the aligning passage 9. Considering the flow of the electronic component chips 4 within the hopper 2, it is understood that the sectional area of the path for the electronic component chips 4 is abruptly reduced at a portion where the small chamber 8 communicates with the inlet 10 of the aligning passage 9. Thus, an electronic component chip 4 approaching the aligning passage 9 tends to block the inlet 10 and interrupt smooth flow of succeeding chips. In order to prevent this, the compressed air is introduced through the blowing passage 13 in an intermittent manner, for example.

Thus, the plurality of electronic component chips 4 supplied from the cassette 1 pass through the large chamber 7 and the small chamber 8 to approach the aligning passage 9, and are aligned along a prescribed direction to enter the inlet 10. Then the electronic component chips 4 are guided by the aligning passage 9 and discharged from the outlet 14. The electronic component chips 4 discharged from the outlet 14 are aligned in the prescribed direction. Thus, the chip mounting step can be efficiently carried out by retaining the electronic component chips 4 in the aligned state.

FIG. 8 shows no wall surface provided in front of the hopper 2. In practice, such a wall surface (not shown) is positioned along a plane 15, to close the small chamber 8, the aligning passage 9 and the large chamber 7. Therefore, a space defined within the small chamber 8 has a cross-directional size 16. Further, this space has a vertical size 17 on the basis of the bottom wall surface 11, as well as a vertical size 18 on the basis of another part.

FIG. 8 shows three electronic components 4, for example, which are horizontally aligned with each other and nine electronic component chips 4, for example, which are vertically aligned with each other. The total of the cross-directional sizes of the horizontally aligned electronic component chips 4 accidentally coincides with the cross-directional size 16 of the space defined in the small chamber 8. Thus, these electronic component chips 4 unmovably butt against each other between the wall surfaces defining the cross-directional size 16. On the other hand, the total of the perpendicular sizes of the vertically aligned electronic component chips 4 accidentally coincides with the vertical size 17 of the space defined in the small chamber 8. Thus, these electronic component chips 4 unmovably butt against each other between the wall surfaces defining the vertical size 17.

Once such a phenomenon, i.e., the so-called "bridge phenomenon" takes place, it is difficult to separate the electronic component chips 4 which are in such series from each other even if compressed air is introduced through the blowing passage 13.

The aforementioned "bridge phenomenon" is not restricted to the modes shown in FIG. 8, but may occur in various modes in response to relation between the cross-directional and vertical sizes 16, 17 and 18 and the sizes of the electronic component chips 4. In other words, this phenomenon easily takes place when the combination of the longitudinal, cross-directional and perpendicular sizes of the plurality of electronic component chips 4 accidentally corresponds to the cross-directional size 16 or the vertical size 17 or 18 of the space defined in the small chamber 8.

The "bridge phenomenon" is not so frequent but merely occurs in the order of p.p.m. in general. Once the "bridge phenomenon" takes place, however, it is impossible or difficult to supply the electronic component chips 4 to the aligning passage 9. In order to improve workability and reliability of a chip mounting apparatus or the like, therefore, it is desirable to make the probability for the "bridge phenomenon" substantially zero.

SUMMARY OF THE INVENTION

Accordingly, an object of the present invention is to improve an apparatus for aligning/supplying electronic component chips, which is represented by the aforementioned hopper, for absolutely or substantially preventing occurrence of a "bridge phenomenon".

The present invention is directed to an apparatus for aligning/supplying electronic component chips which comprises an aligning passage for guiding and moving a plurality of electronic component chips in a state aligned with each other along a prescribed direction, and a chamber communicating with the aligning passage and defining a space having a cross-section larger than that of the aligning passage on an inlet side of the aligning passage for storing the plurality of electronic component chips. In order to solve the aforementioned technical problem, the inventive apparatus has the following structure:

The chamber at least comprises a small chamber which is formed in the vicinity of the inlet of the aligning passage and a large chamber which communicates with the small chamber. The small chamber has a bottom wall surface which is flush with a bottom wall surface defining the inlet of the aligning passage. The present invention is particularly characterized in that a surface, which is unparallel and unorthogonal to the bottom wall surface when viewed in cross-section as defined by a plane which is parallel to a direction across the aligning passage, is formed at least in a part of the wall surfaces, excluding the bottom wall surface, defining the small chamber. This plane is provided by a gradient plane or a rounded face, for example.

The plane such as a gradient plane or a rounded face, which is formed in the small chamber of the inventive apparatus for aligning/supplying electronic component chips, will almost never come into surface contact with electronic component chips so as to cause a "bridge phenomenon". In general, the plane merely comes into line contact or point contact with such electronic component chips.

Thus, according to the present invention, the plane such as a gradient plane or a rounded face generally comes into mere line contact or point contact with electronic component chips that may cause a "bridge phenomenon", and hence the "bridge phenomenon" itself can hardly take place. Even if a "bridge phenomenon" apparently occurs, the electronic component chips can be easily separated from each other by compressed air which is introduced through a blowing passage, other external force, or the like.

Thus, it is possible to smoothly move a plurality of electronic component chips in the inventive apparatus for aligning/supplying electronic component chips, thereby smoothly supplying the electronic component chips through the aligning passage. Therefore, when the inventive apparatus for aligning/supplying electronic component chips is applied to a chip mounting apparatus, for example, a chip mounting step can be carried out with high workability and reliability.

In order to attain the effect according to the present invention, the plane such as a gradient plane or a rounded face may simply be formed in at least a part of the wall surfaces defining the small chamber. Thus, the present invention can be implemented with only a slight increase in cost. When the part of the wall surfaces defining the small chamber is formed by an element which is independent of other parts of the apparatus for aligning/supplying electronic component chips, for example, the structure characterizing the present invention can be implemented by providing the independent element with a plane such as a gradient plane or a rounded face.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
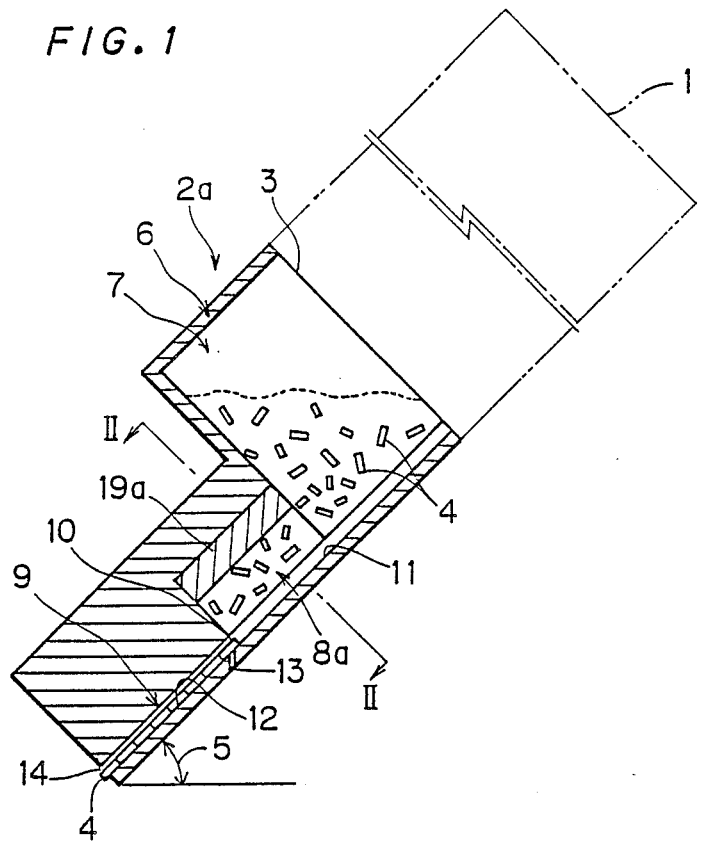
FIG. 1 is a longitudinal sectional view showing a hopper 2a according to an embodiment of the present invention.
Figure 2:
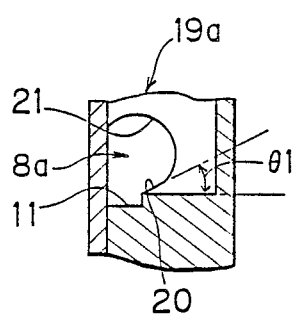
FIG. 2 is a sectional view taken along the line II—II in FIG. 1.
Figure 7:
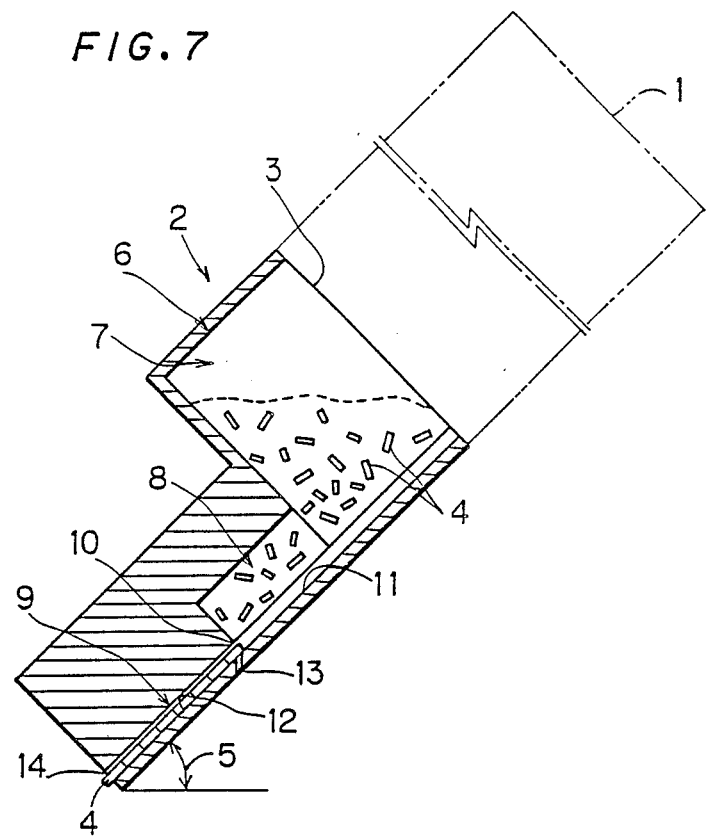
FIG. 7 is a longitudinal sectional view, corresponding to FIG. 1, showing a hopper 2 for illustrating a problem to be solved by the invention.
Figure 8:
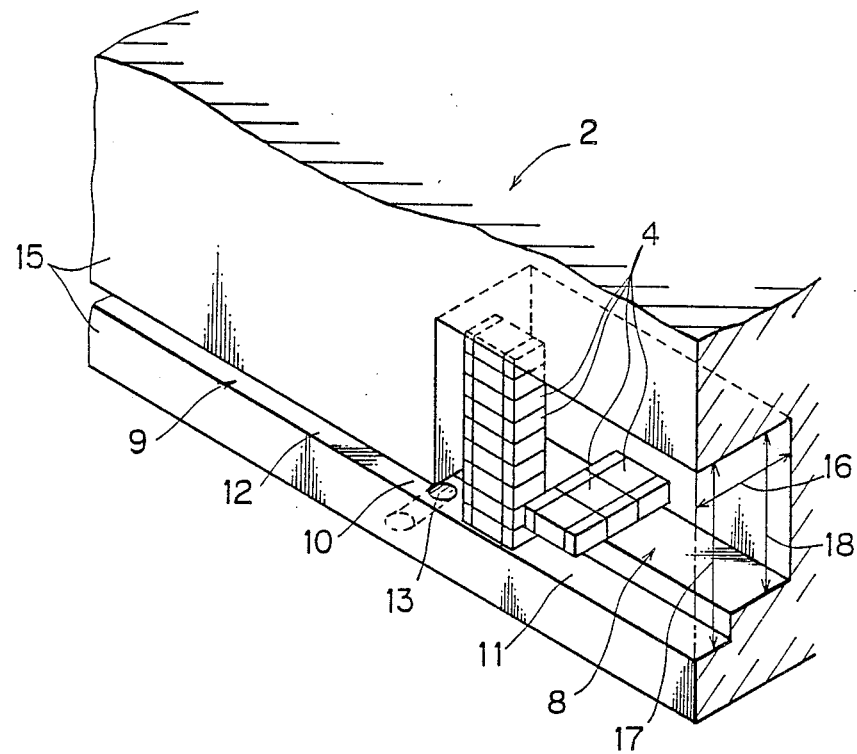
FIG. 8 is an enlarged perspective view illustrating a principal part of the hopper 2 shown in FIG. 7.

FIG. 1 shows a hopper 2a according to an embodiment of the present invention, in correspondence to FIG. 7. Referring to FIG. 1, elements corresponding to those shown in FIG. 7 are denoted by the same or similar reference numerals, and hence redundant description is omitted. FIG. 2 is a sectional view taken along the line II—II in FIG. 1.

The feature of the hopper 2a resides in wall surfaces defining a small chamber 8a. According to this embodiment, a wall surface forming member 19a, which is prepared independently of other parts of the hopper 2a, provides a part of the wall surfaces defining the small chamber 8a. This wall surface forming member 19a is fixed to other parts of the hopper 2a by screws, an adhesive agent or the like. FIG. 2 shows configurations of the wall surfaces defining the small chamber 8a in view of a section which is parallel to a direction across an aligning passage 9. As understood from FIG. 2, the wall surface forming member 19a provides a part of the wall surfaces, excluding a bottom wall surface 11 of the small chamber 8a, and forms a gradient plane 20 which is unparallel and unorthogonal to the bottom wall surface 11. The wall surface forming member 19a further forms a rounded face 21, which extends in series with the gradient plane 20. It is noted that the section of the wall surface forming member 19a shown in FIG. 2 is not hatched. Similarly, wall surface forming members shown in FIGS. 3, 4, 5 and 6 are not hatched either.

An angle $\theta 1$ provided by the aforementioned gradient plane 20 is preferably set at about 30° to 45°.

FIGS. 3, 4, 5 and 6 are sectional views corresponding to FIG. 2, showing other embodiments of the present invention respectively.

Figure 3:
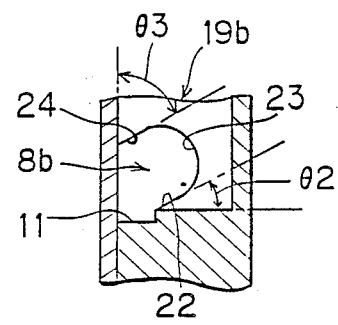
FIGS. 3, 4, 5 and 6 are sectional views, corresponding to FIG. 2, showing other embodiments of the present invention.

In the embodiment shown in FIG. 3, a wall surface forming member 19b provides a part of wall surfaces defining a small chamber 8b. This wall surface forming member 19b provides a gradient plane 22, which is unparallel and unorthogonal to a bottom wall surface 11 of the small chamber 8b. The wall surface forming member 19b further forms a rounded face 23 which is in series with the gradient plane 22, as well as another plane 24.

An angle $\theta 2$ provided by the gradient plane 22 is preferably set at about 30° to 45°. Further, an angle $\theta 3$ provided by the plane 24 is preferably set at about 30° to 90°.

Figure 4:
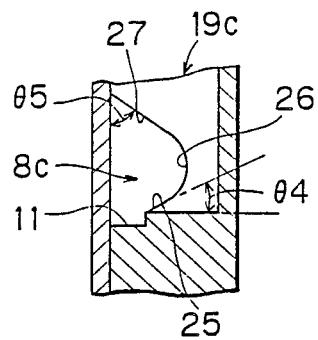

In the embodiment shown in FIG. 4, a wall surface forming member 19c provides a part of wall surfaces defining a small chamber 8c. This wall surface forming member 19c forms a gradient plane 25 which is unparallel and unorthogonal to a bottom wall surface 11 of the small chamber 8c. The wall surface forming member 19c further forms a rounded face 26 which is in series with the gradient plane 25, as well as another plane 27 which is in series with the rounded face 26.

An angle $\theta 4$ provided by the gradient plane 25 is preferably set at about 30° to 45°. Further, an angle $\theta 5$ provided by the plane 27 is preferably set at about 30° to 90°.

Figure 5:
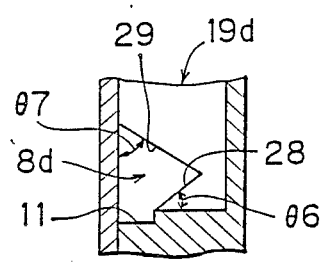

In the embodiment shown in FIG. 5, a wall surface forming member 19d provides a part of wall surfaces defining a small chamber 8d. This wall surface forming member 19d forms a gradient plane 28 which is unparallel and unorthogonal to a bottom wall surface 11 of the small chamber 8d, as well as another plane 29 which intersects with the gradient plane 28.

An angle $\theta 6$ provided by the gradient plane 28 is preferably set at about 30° to 45°, while an angle $\theta 7$ provided by the plane 29 is preferably set at about 30° to 90°.

Figure 6:
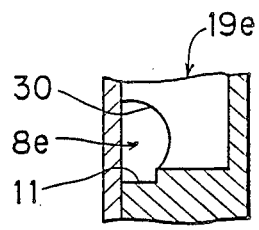

In the embodiment shown in FIG. 6, a wall surface forming member 19e provides a part of wall surfaces defining a small chamber 8e. This wall surface forming member 19e provides a principal part of wall surfaces excluding a bottom wall surface 11 of the small chamber 8e, and forms a rounded face 30.

According to each of the embodiments shown in FIGS. 2 to 6, it is possible to reduce such a probability that electronic component chips existing in the small chamber 8a, 8b, 8c, 8d or 8e come into surface contact with the wall surfaces defining the small chamber, thereby substantially preventing the electronic component chips from the "bridge phenomenon". In each of the embodiments shown in FIGS. 2 to 5, further, the rounded face 21, 23 or 26 or the inclined plane 24, 27 or 29 can also contribute to reduction of the probability for the "bridge phenomenon".

Although the wall surface forming member 19a, 19b, 19c, 19d or 19e is formed by an element which is independent of other parts of the hopper 2a in each of the aforementioned embodiments, the hopper may be integrally provided with a part corresponding to a wall surface forming member, i.e., a gradient plane or a rounded face.

In the embodiment shown in FIG. 1, the aligning passage 9 extends in an inclined state to upwardly locate its inlet 10, so that the electronic component chips 4 entering the aligning passage 9 are moved toward the outlet 14 due to natural gravitational force. Alternatively, the aligning passage 9 may be at least partially directed to extend in the horizontal direction, for example, in order to extract the electronic component chips 4 from the outlet 14 by vacuum suction or the like, for example.

The inventive apparatus for aligning/supplying electronic component chips is applied to the hopper 2a in each of the embodiments shown in the drawings. Alternatively, the cassette 1 storing electronic component chips itself may be provided with an aligning passage, for example, so that the structure characterizing the present invention is employed in relation to a small chamber which communicates with the aligning passage.

While the electronic component chips 4 are in the form of rectangular parallelepipeds in each of the embodiments shown in the drawings, the electronic component chips may have arbitrary configurations such as those of disks or cylinders, for example.

Although the present invention has been described and illustrated in detail, it is clearly understood that the same is by way of illustration and example only and is not to be taken by way of limitation, the scope of the present invention being limited only by the terms of the appended claims.

What is claimed is:

1. An apparatus for aligning/supplying electronic component chips, comprising:
    means defining an aligning passage for guiding and moving a plurality of electronic component chips in a state aligned with each other along a prescribed direction; and
    means defining a chamber communicating with said aligning passage and defining a space having a larger cross-section than said aligning passage at an inlet of said aligning passage for storing a plurality of electronic component chips,
    said chamber at least comprising a small chamber formed in the vicinity of said inlet of said aligning passage and a large chamber communicating with said small chamber,
    wherein a bottom wall surface of said small chamber is flush with a bottom wall surface of said inlet of said aligning passage, and
    wherein said small chamber is partially defined by a guide surface which is substantially unparallel and unorthogonal to said bottom wall surface, when viewed according to a section plane defined parallel to a direction across said aligning passage, said guide surface forming at least a part of the wall surfaces, other then said bottom wall surface, defining said small chamber.

2. An apparatus for aligning/supplying electronic component chips in accordance with claim 1, wherein said guide surface includes a gradient plane forming an angle with said bottom wall surface.

3. An apparatus for aligning/supplying electronic component chips in accordance with claim 1, wherein said guide surface includes a rounded face.

4. An apparatus for aligning/supplying electronic component chips in accordance with claim 1, wherein said guide surface includes both a gradient plane forming an angle with said bottom wall surface, and a rounded face.

5. An apparatus for aligning/supplying electronic component chips in accordance with claim 1, wherein said guide surface is formed on a forming member which is arranged in said small chamber.

* * * * *